United States Patent [19]

Freeman et al.

[11] Patent Number: 4,472,145
[45] Date of Patent: Sep. 18, 1984

[54] APPARATUS FOR TEACHING ELECTROCHEMICAL PRINCIPLES

[75] Inventors: William H. Freeman, San Francisco; Karl J. Abrams; Manus B. Monroe, both of Novato, all of Calif.

[73] Assignee: Freeman, Cooper & Company, San Francisco, Calif.

[21] Appl. No.: 450,484

[22] Filed: Dec. 16, 1982

[51] Int. Cl.³ .............................................. G09B 23/24
[52] U.S. Cl. ..................................... 434/298; 434/301
[58] Field of Search ................ 434/298, 301; 204/267, 204/412, DIG. 6

[56] References Cited

U.S. PATENT DOCUMENTS 1,144,680  6/1915  Allers ................................. 204/267

OTHER PUBLICATIONS

Cenco Electrolysis Apparatus, Brownlee's Form, p. 91 of 1969 Cenco Educational Catalog.

Conductivity of Solutions Apparatus, No. 81180, p. 91 of 1969 Cenco Educational Catalog.

Primary Examiner—Harland S. Skogquist
Attorney, Agent, or Firm—Townsend and Townsend

[57]  ABSTRACT

Apparatus for performing electrochemical experiments in a laboratory for teaching the principles thereof is disclosed. The apparatus includes a holder unit, having a plurality of fluid-receiving recesses, and ion-conductive elements or substances, formed from a plant material having sufficient capillary action to permit ion travel therethrough. One recess receives an electrolytic solution, any remaining two recesses receive metallic salt solutions, and an ion-conductive substance is placed to extend from immersion in each salt solution to the electrolyte solution, forming in conjunction with the electrolytic solution an ion-conducting electrolyte bridge. Thin strips of a metal element are partially immersed in each reactant solution to initiate oxidation-reduction reactions, creating dissimilar electrodes forming a galvanic cell.

20 Claims, 2 Drawing Figures

U.S. Patent  Sep. 18, 1984  4,472,145
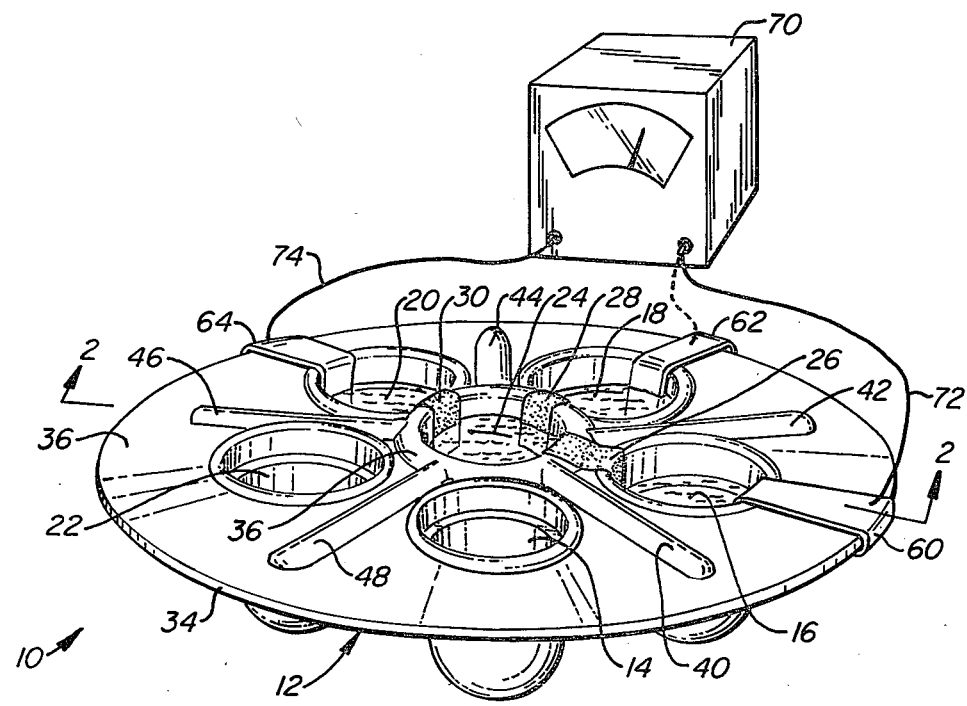
FIG._1.
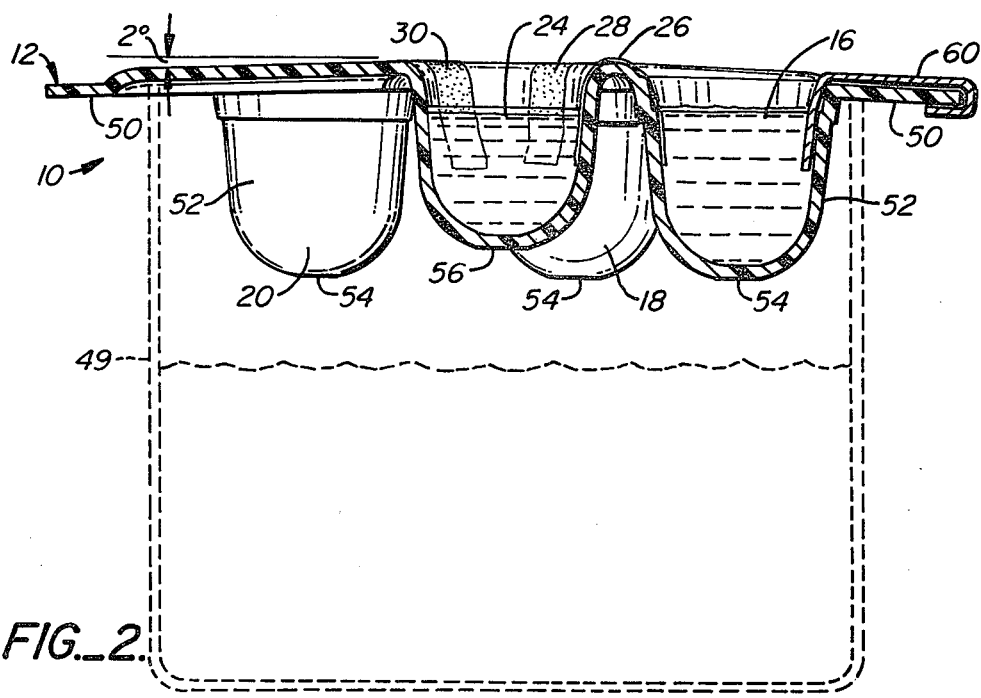
FIG._2.

APPARATUS FOR TEACHING ELECTROCHEMICAL PRINCIPLES

BACKGROUND OF THE INVENTION

The present invention relates generally to teaching devices, and more particularly to laboratory apparatus for teaching the concepts of electrochemical principles.

The production of an electric current through the utilization of an oxidation-reduction reaction is a well-known concept in electrochemistry. It is also a concept that is taught in many, if not all, high school and college chemistry courses, and typically forms the basis of electrochemistry experiments performed by students in laboratory sections of the class.

Generally, this concept is taught in the school laboratory by providing the student with the materials to construct two or more dissimilar electrodes so that the potential difference of each electrode couple can be measured. Usually, the materials the student receives include at least a pair of metallic salt (reactant) solutions such as, for example, a $ZnSO_4$ solution and a $CuSO_4$ solution, and apparatus that holds the solutions in a manner that keeps them from mechanically mixing with one another, yet permits the passage of ions from one to the other. A zinc metal electrode and a copper metal electrode are respectively placed in the $ZnSO_4$ and $CuSO_4$ solutions to create what is known as an electrochemical or galvanic cell. The student then determines the voltage potential by measuring the electron flow from the zinc electrode to the copper electrode with a commonly available voltmeter.

One method of mechanically isolating, yet providing ion travel between, the reactant solutions is to provide some type of a porous partition that separates the solutions, thereby creating the galvanic cell. This method requires a container that is divided into two liquid-receiving chambers by a porous material—usually a porous porcelain cup that holds one of the reactant solutions and rests in the other reactant. Alternately, the solutions can be placed in separate beakers. A "salt bridge," usually a U-shaped glass tube containing a solution of an electrolyte (such as $NH_4NO_3$ or $KNO_3$) and stoppered at each end with glass wool, forms the connection between the two solutions for the passage of ions. The salt bridge can also be constructed by filling the tube with a gelatinous material in which is dissolved a salt (such as 3.0 g of agar-agar added to 600 ml of boiling 1 M potassium nitrate solution), forming the requisite electrolyte bridge.

Unfortunately, there is considerable expense involved in obtaining the necessary above-described apparatus and materials. A substantial amount of glassware is called for, particularly in chemistry laboratories of schools of any size. This, in turn, can create inventory problems: Where and how is the apparatus to be stored? Cleaning the apparatus, both before and after use, presents not insubstantial problems and expense due to breakage. Since much of the apparatus used (glass beakers, glass tubes and porous porcelain cups) is relatively fragile, allowing students to clean the materials can increase the expense of laboratory equipment by the breakage that will typically be encountered. If hired help is to clean the apparatus the cost goes up accordingly, depending not only on how much must be paid the help but, to a certain extent, on the manual dexterity of the help. And, even if lab personnel rather than students clean the apparatus after use, breakage still remains a problem by students since they typically perform their own set-up of experiments.

Further, because it is desirable that whatever is used for such electrochemical (teaching) experiments be usable in other learning experiments in the lab, relatively large beakers (i.e., on the order of 450 ml) are used. This causes consumption of larger amounts of reactants than really necessary, increasing the expense to the school. In addition, disposal of the solutions (both the reactants and the bridge electrolyte) can create difficulty if pollution problems are to be avoided—particularly for larger schools having a high proportion of chemistry students.

In addition, it can be tedious and time-consuming to clean the glassware, particularly U-shaped tubes, to avoid contamination. And, when using a gelatinous substance (i.e., agar-agar) as the bridge electrolyte, pains must be taken to avoid bacterial contamination of the substance. A salt bridge, after one use, cannot be used again until it is meticulously cleaned and repacked.

Finally, the time required for assembly and disassembly of galvanic cells in a school laboratory using present techniques and apparatus seriously reduces the number of electrochemical set-ups and experiments that can be made by a student. If more time is allotted to teach, in the laboratory, some of the finer aspects of electrochemistry and oxidation-reduction reactions—such as entropy, thermodynamics and the way galvanic cells of different chemical make-up react—other portions of the chemistry course may suffer accordingly.

SUMMARY OF THE INVENTION

The present invention provides apparatus adapted for use with reactant solutions to form one or more galvanic cells to perform electrochemical laboratory experiments. The invention is simple and inexpensive to set up, easy to use, and configured to use a minimum of reactant solutions, yet avoid the prior problems of breakage and expense.

According to the present invention there is provided a holder unit having formed therein a number of liquid-receiving recesses. One recess is relatively located adjacent each of the other recesses and is intended to receive an electrolytic salt solution that forms the bridge electrolyte. The remaining (adjacent) recesses are intended to receive the metallic salt solution reactants. An ion-conducting element or substance, formed from a plant material having sufficient capillary action to permit ions to travel therethrough, is provided to interconnect each reactant salt solution with the electrolytic solution. Electrodes of a metal appropriate to permit oxidation-reduction reactions to occur are brought into contact with the reactants to form one or more galvanic cells. Electric wire can then be connected to each electrode and to an instrument (i.e., voltmeter or ammeter) to measure electron current flow from one half-cell to another to determine the potential difference between any two-electrode couple.

In the preferred embodiment, the holder unit is formed as a single unitary structure and fabricated from a plastic material that is impervious to the reactants used. The holder unit has one recess formed generally in the center, and the remaining recesses are formed in proximate and surrounding relation to the central recess.

Thin, short strips of porous paper (i.e., filter paper, such as that typically found in a chemistry laboratory)

complete the ion-conducting salt bridge. The strips are of a length to allow each strip to have one end portion be immersed in the content of the central recess and an opposite end portion be immersed in the content of one of the surrounding recesses.

The upper peripheries of the recesses are formed in the holder unit to be generally coplanar and held in spaced relation from one another by an upward-facing surface upon which is formed raised ridges between each of the recesses. The ridges function as dividers to aid in keeping spillage that may occur when pouring a solution into one recess from running into a nearby recess. In addition, the upward-facing surface is formed to cant slightly downward and away from the central recess to direct any spill toward the outer periphery of the surface.

In use, the central recess is provided with an electrolyte solution. Any two or more of the surrounding recesses are provided with different reactant metallic salt solutions. A thin strip of metal is placed in each reactant solution, the metal of each strip being of the same element as in the recess salt solution to create a galvanic half cell. A strip (possibly pre-moistened) of filter paper is placed to extend from each surrounding reactant solution to the central electrolyte, forming the ion-communicating (salt) bridge for each set of two galvanic half cells to form a full battery cell.

A number of advantages are attendant with the present invention. The expense of providing materials to students in order that they may perform one or more electrochemical experiments is greatly reduced—either directly or indirectly—by the present invention. Direct reduction of expense is achieved by the apparatus itself: Manufacture of the holder unit is much less costly than the glassware presently used; and, the expense of a conventional salt bridge (i.e., the glass tube, the material for insertion in the tube, and the expense of construction) is significantly reduced. The expense of conducting electrochemical experiments in the laboratory (classroom) environment is indirectly reduced by providing apparatus that is resistant to breakage; by elimination of apparatus that calls for the use of relatively larger volumes of solutions; and apparatus that, as will be more fully described in the following detailed description of the invention, is adapted to allow a number of electrochemical experiments to be conducted in a relatively short period of time.

For a more thorough understanding of the nature and advantages of the present invention, reference should be had to the ensuing detailed description, which should be taken in conjunction with the accompanying drawings.

BRIEF DESCRIPTION OF THE DRAWINGS

FIG. 1 is a perspective view illustrating the electrochemical experiment/teaching apparatus of the present invention;

FIG. 2 is a cross-sectional view taken along the lines 2—2 of FIG. 1, illustrating construction of the present invention.

DETAILED DESCRIPTION OF THE INVENTION

Referring to the drawings, and particularly FIG. 1, there is illustrated the electrochemical teaching device of the present invention, generally designated with the reference numeral 10. As shown, the teaching device 10 includes a holder unit 12 in which are formed a number of liquid-receiving recesses 14–24, and ion-communicating elements or substances 26–30. The holder unit 12 is formed as a single, unitary structure with an annular, flange-like plate 34 that extends radially outward from the periphery of the centrally located recess 24.

The plate 34 forms a generally upward-facing surface 36. Formed on the surface 36 is a raised, annular ridge 38 surrounding the central recess 24, and, extending radially outward from the annular ridge 38, are linear ridges 40–48. The raised ridges 38–48 function to assist in minimizing contaminating adjacent or nearby ones of the recesses 14–24 in the event of spillage when a solution is being poured into one of the recesses.

In addition, the plate 34 tends to have a downward cant away from the central recess 24 (FIG. 2) so that any spillage will tend to be urged toward the periphery of the plate. The angle of downward cant of plate 34 is preferably approximately 2°, although it is believed that a downward cant in the range of 1°–5° will also work.

The holder 12 is preferably fabricated of a plastic or similar material that will not react with the solution that will be contained within the recesses 14–24. The ion-communicating substances 26–30 are preferably formed from a plant material having cellulose fibers that are long enough to provide the necessary capillary action for ion flow. Any plant material may be used such as, for example, cannon string, cloth wick, hemp, twine, yarn, or absorbent paper. Conventional filter paper is preferred because it fulfills the necessary requirements of permitting ion flow, is readily available in chemistry labs, is inexpensive, and is easily handled by students. Tightly pressed or calendered paper is not acceptable because it does not permit an ion flow as free as that permitted by filter paper. Similarly, tree bark is also too "tight" to properly serve as the ion transmission element. Newsprint is not usable because it disintegrates with moisture.

It has been found that 5 mL of reactant solutions is all that is necessary to perform an electrochemical experiment of the oxidation-reduction type. Accordingly, the volumetric dimensions for the recesses 14–24 need only be large enough to accept 5 mL of solution. In addition, it is suggested that the holder unit be configured so that the circular arrangement of the recesses 14–22 can be set in the opening of a standard 600 mL beaker 49 (illustrated in phantom in FIG. 2) and held at the upper periphery of the beaker by the radially extending rim 50 (FIG. 2) so that the underlying surfaces of the holder unit 12 that form recesses 14–24 extend into the beaker. This allows the holder unit 12 to be set on a 600 mL beaker, about one-half full of tap water (at room temperature) to provide the holder 12 with a stable base during use. Further, the beaker can also be used with the holder 12 by a student to observe the thermodynamic effects upon oxidation-reduction reactions and their voltages. For this latter observation the water held by the beaker 50 (upon which holder 12 is placed) will have been heated.

Finally, the dimensions of the outer recesses 14–22, as compared to that of recess 24 (FIG. 2) are such that the bottom portions 54 of the recesses 14–22 extend below the bottom portion 56 of recess 24. This allows a firm base to be formed in the event the unit is set on a table or other flat surface.

The electrochemical teaching apparatus 10 is used as follows: The central recess 24 is provided with an electrolytic salt solution such as, for example, potassium nitrate ($KNO_3$). The outer recesses will receive metallic salt (reactant) solutions. Thus, for example, recess 16 can be provided with a 1.0 M solution of lead nitrate; recess 18 can receive a 1.0 M solution of copper sulfate; and recess 20 can receive a 1.0 M solution of zinc nitrate. Small, pliable, elongate, metal strips 60, 62 and 64 of lead, copper, and zinc, respectively form the electrodes. The strips 60–64 are bent and configured so that they can be attached to the holder 12 in the manner shown in FIGS. 1 and 2. The electrodes are of a length that allow one end, when attached to the rim 49 of the holder unit, to extend into a corresponding recess and be immersed in the reactant solution contained in that recess. Finally, strips of filter paper 26, 28 and 30 (which are possibly first dampened with de-ionized water) are each respectively placed to run from the central recess 24 to the outer recesses 14, 16, 18, 20 and 22. Each of five strips (26–30) will be held in place by dampness.

After waiting approximately one minute (to allow the oxidation-reduction process time to commence) a voltmeter 70 is attached to electrodes 60 and 64 by electrical wires 72, 74, respectively. Although not specifically shown, the electrical wires 72 and 74 can be removably attached to the electrodes by any appropriate attachment means such as, for example, alligator clips. The voltage produced by the oxidation-reduction reactions of the half-cells formed (by the solutions in recess 16 and 20 and the corresponding electrodes 60 and 64) are then measured. Similarly, the wire 72 from volt meter 70 can be removed from the electrode 60 and applied to electrode 62 (as illustrated in phantom) to measure the voltage produced by the oxidation-reduction reactions occurring between the two electrodes and the metal solutions contained within the recesses 18, 20.

In the above-described galvanic cell set-up, there must be an ion transfer between, for example, the zinc solution in recess 20 and the lead (or copper) solution in recess 16 (or 18), respectively, in order to maintain electrical balance. Here, the ion transfer is effected by the ion bridge created by the filter paper elements 26, 28 and 30, together with the electrolytic solution contained in recess 24. When the measurements are complete, the small amounts of reactant solutions can quickly be disposed of, together with the filter paper substances 26–30, and the holder 12 easily cleaned. In this respect, note that the inner surfaces of the recesses (see FIG. 2) are formed without any sharp corners. This allows the recesses to be easily and quickly cleaned without the possibility of contamination being left in a hard-to-reach crevice.

It should also be noted that if all five outer recesses 14–22 were used to form half-cells for oxidation-reduction reactions, ten separate experiments can be conducted in about the time required for one with conventional equipment.

In summary, therefore, there has been disclosed a teaching apparatus for conducting laboratory electrochemical experiments of the type utilizing the oxidation-reduction concept. The apparatus utilizes inexpensive, relatively sturdy materials in a way that minimizes assembly, use and disassembly times. The apparatus uses significantly lesser amounts of chemicals, some, such as silver nitrate, quite costly. This also reduces the problems of chemical discards.

It should be evident that although the present invention has been disclosed in terms of a detailed description of the preferred embodiment, other alterations and modifications are available. For example, the number of outer recesses can be increased from five to any number, thereby increasing the number of experiments capable of being performed at any one time. Such other modifications and alternate constructions may be employed without departing from the true spirit and scope of the invention. Therefore, the above description and illustrations should not be construed as limiting the scope of the invention which is defined by the appended claims.

What is claimed is:

1. Apparatus for teaching electrochemical concepts of the type involving oxidation-reduction reactions using first and second reactant metallic salt solutions and electrodes of first and second metals respectively placed in said solutions to measure a voltage difference therebetween, the apparatus comprising:
    holder means having formed therein at least three liquid-receiving recesses, a first and a second of said recesses adapted to respectively receive the first and second solutions, a third of said recesses adapted to receive an electrolyte solution; and
    a pair of ion-conducting substances, each formed from a plant material having a capillary action sufficient to permit ion travel and each having a dimension sufficient to allow opposed ends of each substance to be brought into contact with a corresponding one of said reactant metallic salt solutions and said electrolyte solution contained in said first, second and third recesses.

2. The apparatus of claim 1, wherein the holder means is formed as a single unitary structure.

3. The apparatus of claim 2, wherein the holder means includes means formed generally about upper peripheries of the recesses to avoid spillage and contamination.

4. The apparatus of claim 2, the holder means including a generally vertical, upward-facing surface formed in surrounding relation to the upper peripheries of the recesses, and including raised ridges formed on said upper surface and extending between said upper peripheries.

5. The apparatus of claim 4, the raised ridges including an annular ridge formed in generally surrounding relation to the third recess.

6. The apparatus of claim 5, including a plurality of first and second recesses formed in generally surrounding relation to the third recess, the ridges including radial portions formed on the upper surface and extending generally radially away from the annular portion.

7. The apparatus of claim 1, wherein the ion-conducting substances are formed from absorbent paper.

8. The apparatus of claim 1, wherein the ion-conducting substances are formed from a cloth wick.

9. The apparatus of claim 1, wherein the ion-conducting substances are formed from hemp.

10. A method of performing an electrochemical experiment to measure the voltage difference between a pair of reactants in which an oxidation-reduction reaction occurs, the method comprising:
    providing a pair of metallic salt reactant solutions;
    providing an electrolyte solution;
    placing a first ion-conductive substance formed from a plant material in contact with the electrolyte solution and one of the reactants;
    placing a second ion-conductive substance formed from a plant material in contact with the electrolyte and the other of the reactants;

placing a metallic element of a type to allow an oxidation-reduction reaction to take place in each of the metallic salt reactant solutions; and measuring the voltage difference between the metallic elements.

11. Apparatus for teaching electrochemical principles by performing oxidation-reduction reactions involving metallic salt solution reactants, the apparatus comprising:

container means for holding the reactants and an electrolytic solution, the container means being formed as a single, unitary structure and including a first liquid-receiving recess for holding the electrolyte solution, a plurality of second liquid-receiving recesses arranged proximate said first recess for holding the metallic salt solution reactants, and an upward-facing surface formed to extend from and between upper peripheries of the first and second recesses; and a plurality of ion transfer means formed from a plant material having sufficient capillary action to permit ion travel therethrough, each ion transfer means having a dimension sufficient to allow the transfer means to be immersed in a one of the metallic salt solution reactants and the electrolyte solution simultaneously.

12. The apparatus of claim 11, wherein the transfer means is absorbent paper.

13. The apparatus of claim 11, wherein the transfer means is cotton string.

14. The apparatus of claim 11, wherein the plurality of second recesses are formed in a generally circular arrangement about the first recess.

15. The apparatus of claim 11, wherein the upward-facing surface includes an outer periphery, the surface having a downward cant from an upper periphery of the first recess to the outer periphery.

16. The apparatus of claim 15, wherein the downward cant is in the range of 1°–5° from horizontal.

17. The apparatus of claim 15, wherein the downward cant is approximately 2°.

18. The apparatus of claim 11, wherein the container means is formed from a plastic material that is impervious to the metallic salt reactant solutions.

19. The apparatus of claim 15, including upraised ridges formed on the upward-facing surface and separating each of the first and second recesses from one another.

20. The apparatus of claim 19, including an annular ridge formed proximate to and about the first recess and a plurality generally linear of radially extending from the annular ridge and toward the outer periphery.

* * * * *